Dec. 3, 1929.  S. W. PARSONS  1,738,015
BALL BEARING HINGE
Filed Dec. 14, 1923
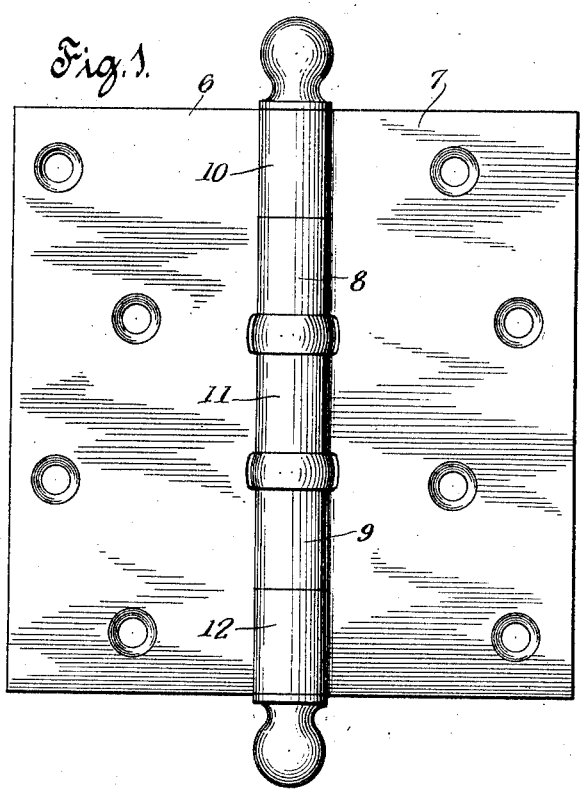
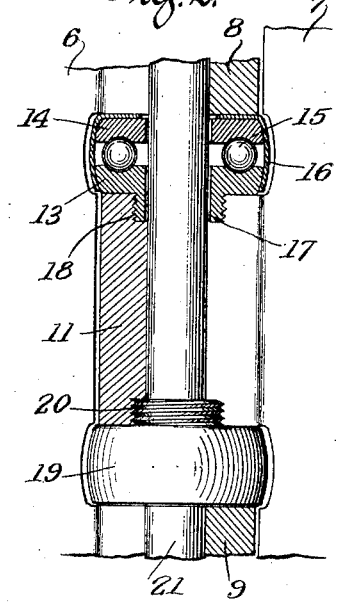
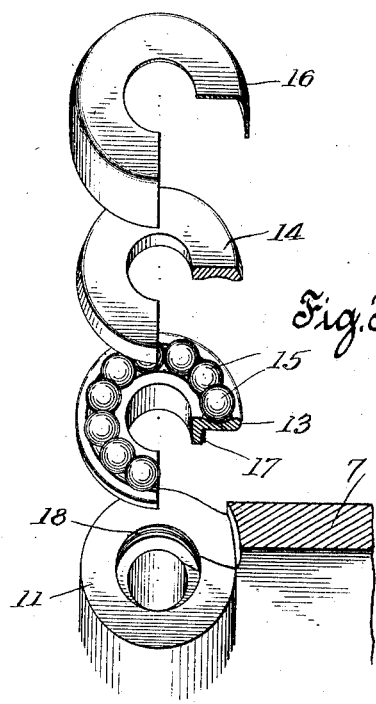
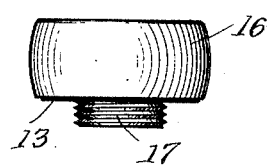
INVENTOR
S. W. Parsons
BY
ATTORNEY Patented Dec. 3, 1929

1,738,015

UNITED STATES PATENT OFFICE

STUART W. PARSONS, OF NEW BRITAIN, CONNECTICUT, ASSIGNOR TO THE STANLEY WORKS, OF NEW BRITAIN, CONNECTICUT, A CORPORATION OF CONNECTICUT

BALL-BEARING HINGE

Application filed December 14, 1923. Serial No. 680,598.

My invention relates to constructions of the type of Myers Patent #1,409,461, dated March 14, 1922, in which the anti-friction device is secured to one of the leaves or knuckles of the hinge.

According to my invention I do away with the inner tube and secure the anti-friction device to one of the knuckles preferably by means of a threaded collar. This collar may be integral with one of the washers and have an engagement with one of the knuckles so that it can be readily attached and detached when desired, although ordinarily it is secured snugly in position so that it will not drop off when the parts of the hinge are separated.

Figure 1 is a front view of a hinge embodying improvements of my invention.

Fig. 2 is a fragmentary view partly in longitudinal section on an enlarged scale showing the hinge joint.

Fig. 3 is an exploded view of parts of the hinge joint.

Fig. 4 is an edge view of one of the anti-friction devices.

The leaves 6 and 7 may be of any suitable type and provided with any number of co-operating knuckles such as 8 and 9 carried by a leaf 6 and 10, 11, and 12 carried by the leaf 7.

The anti-friction devices consist of two washers 13 and 14 usually of hardened steel with a series of balls 15 between them preferably in oppositely disposed grooves in the washers. These washers are surrounded by a casing or housing 16 preferably of non-corrosive metal such as brass or copper. The washer 13 is provided with a collar 17 which is adapted to be engaged in a groove 18 in one of the knuckles. This collar and groove are preferably screw threaded so that the anti-friction device may be screwed in place or unscrewed when necessary.

Another anti-friction device 19 having a threaded collar 20 may be secured to the lower end of the knuckle 11. The pintle 21 holds the parts of the hinge together. When the pintle is removed the parts of the hinge may be separated, but it will be seen that the ball bearing devices are secured to one part or the other so that they will not be accidently misplaced or lost. This form of construction permits of the lubrication of the bearing from the inside as there is no inner tube. It will be noted that this form of construction permits of a comparatively large size bearing without weakening the knuckles. The construction is such as to eliminate all unnecessary friction between the parts.

I claim:

1. A butt hinge comprising a pair of leaves having co-acting knuckles, an anti-friction device located between adjacent knuckles and consisting of two bearing washers with oppositely disposed grooved faces, a series of balls traveling in said grooved faces, a casing surrounding said washers, one of said washers having screw threaded means of connection with one of said knuckles, and a pintle for holding said knuckles together, said antifriction device being open at the inside to permit the introduction of lubricant.

2. A hinge comprising a pair of leaves having co-acting knuckles, a pintle for holding said knuckles together, an anti-friction device located between adjacent knuckles and consisting of two bearing washers with a series of balls between them, a casing connecting the edges of said washers, one of said washers having a screw threaded connection with one of said knuckles.

3. A ball bearing hinge comprising a pair of leaves with co-acting knuckles, an anti-friction device between adjacent knuckles comprising two washers with a series of balls between them and an external casing surrounding the outer edges of said washers, one of said washers having a collar screwed into an adjacent knuckle and a pintle passing through said collar and spaced apart from said balls for holding the parts together, said antifriction device being open at the inside to permit the introduction of lubricant, the other washer being rotatable independently of the washer with the collar.

4. A ball bearing hinge comprising a pair of leaves with co-acting knuckles, a pintle extending through the knuckles for holding them together, and an antifriction device between at least one pair of adjacent knuckles, said device comprising hardened raceways, rollers between said raceways, means for holding the parts of said anti-friction device together, and means co-operating with said anti-friction device and with an adjacent knuckle for detachably securing said anti-friction device in place and for longitudinally adjusting said device with respect to the knuckle to which said device is secured.

STUART W. PARSONS.